(12) United States Patent
Day et al.

(10) Patent No.: US 10,216,520 B2
(45) Date of Patent: Feb. 26, 2019

(54) COMPRESSING INSTRUCTION QUEUE FOR A MICROPROCESSOR

(71) Applicant: VIA TECHNOLOGIES, INC., New Taipei (TW)

(72) Inventors: Matthew Daniel Day, Austin, TX (US); G. Glenn Henry, Austin, TX (US); Terry Parks, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 453 days.

(21) Appl. No.: 14/569,313

(22) Filed: Dec. 12, 2014

(65) Prior Publication Data

US 2016/0098277 A1    Apr. 7, 2016

Related U.S. Application Data

(60) Provisional application No. 62/060,374, filed on Oct. 6, 2014.

(51) Int. Cl.
*G06F 9/38* (2018.01)

(52) U.S. Cl.
CPC .............. *G06F 9/3814* (2013.01); *G06F 9/38* (2013.01); *G06F 9/3836* (2013.01)

(58) Field of Classification Search
CPC .................................................... G06F 9/3814
See application file for complete search history.

(56) References Cited

U.S. PATENT DOCUMENTS

| | | | | |
|---|---|---|---|---|
| 5,317,701 A | * | 5/1994 | Reininger | G06F 9/30149 712/207 |
| 5,581,717 A | * | 12/1996 | Boggs | G06F 9/223 712/208 |
| 5,930,520 A | * | 7/1999 | Ando | G06F 9/3802 712/212 |
| 5,954,815 A | * | 9/1999 | Joshi | G06F 9/322 712/206 |
| 6,185,672 B1 | * | 2/2001 | Trull | G06F 9/30152 712/206 |
| 6,442,680 B1 | | 8/2002 | Elnozahy | |
| 6,704,856 B1 | * | 3/2004 | Farrell | G06F 9/3802 712/215 |
| 6,986,029 B2 | | 1/2006 | Yamada et al. | |

(Continued)

FOREIGN PATENT DOCUMENTS

TW    I272537    2/2007

*Primary Examiner* — David J. Huisman
(74) *Attorney, Agent, or Firm* — McClure, Qualey & Rodack, LLP (57) ABSTRACT

A compressing instruction queue for a microprocessor including a storage queue and a redirect logic circuit. The storage queue includes a matrix of storage locations including N rows and M columns for storing microinstructions of the microprocessor in sequential order. The redirect logic circuit is configured to receive and write multiple microinstructions per cycle of a clock signal into sequential storage locations of the storage queue without leaving unused storage locations and beginning at a first available storage location in the storage queue. The redirect logic circuit performs redirection and compression to eliminate empty locations or holes in the storage queue and to reduce the number of write ports interfaced with each storage location of the storage queue.

15 Claims, 7 Drawing Sheets

(56) References Cited

U.S. PATENT DOCUMENTS

| | | |
|---|---|---|
| 7,409,530 B2 | 8/2008 | Kim et al. |
| 7,523,294 B2 | 4/2009 | Lu |
| 2012/0233441 A1* | 9/2012 | Barreh .................. G06F 9/3851 712/206 |

* cited by examiner

COMPRESSING INSTRUCTION QUEUE FOR A MICROPROCESSOR

CROSS-REFERENCE TO RELATED APPLICATIONS

This application claims the benefit of U.S. Provisional Application Ser. No. 62/060,374, filed on Oct. 6, 2014 which is hereby incorporated by reference in its entirety for all intents and purposes.

BACKGROUND OF THE INVENTION

Field of the Invention

The present invention relates in general to microprocessor instruction translation and processing, and more particularly to a compressing instruction queue that improves the process of queuing microinstructions translated from architectural instructions to more efficiently provide the queued microinstructions for subsequent processing.

Description of the Related Art

Many microprocessors incorporate at least one instruction translator that translates architectural instructions into the microinstructions that can be processed by the execution units of the microprocessor. Architectural instructions are the instructions of an instruction set architecture (ISA) of the microprocessor. Examples of architectural instructions include instructions according to the x86 ISA by Intel or the Advanced RISC Machines (ARM®) ISA or the like. In some configurations, the translator converts each architectural instruction into one or more microinstructions. Modern processors are typically superscalar in which multiple instructions are processed simultaneously in each clock cycle. Superscalar microprocessors often include multiple translators in parallel that collectively process multiple architectural instructions during each clock cycle.

Although each architectural instruction may be independently transformed by each of multiple translators into separate microinstructions or microinstruction groups, many processors further perform fusion in which the architectural instructions are combined and microinstructions and/or source information and the like are shared. As a result, the collective set of translators may output any one of many possible combinations of microinstructions in any given clock cycle. Under certain conditions the translators may output zero microinstructions in some clock cycles or may produce up to a predetermined maximum number of microinstructions in other clock cycles. The varied and somewhat unpredictable translated microinstruction combinations have caused processing inefficiencies.

The translated microinstructions are eventually provided to pre-execution logic, such as a register alias table (RAT) or the like. The RAT generates dependency information for each microinstruction based on its program order, based on the operand sources it specifies, and also based on renaming information. The RAT, however, is configured to receive up to a limited number of microinstructions at a time. In one embodiment, for example, the RAT is able to receive and process up to three microinstructions in each clock cycle. In prior configurations, a spill buffer or queue or the like was provided before or at the front end of the RAT to decouple the translators from the RAT. The spill buffer was organized into rows in which each row normally held up to the number of microinstructions that could be handled by the RAT in each clock cycle. Thus, for example, if the RAT could process up to three microinstructions, then each row of the spill buffer included three entries.

The variation of translator output and the fixed RAT input caused unused buffer storage and inefficient operation. Any additional microinstructions output from the translators that could not be stored in the current row of the spill buffer or that could not be readily consumed by the RAT in the current clock cycle were simply discarded. The unprocessed architectural instructions were shifted and translated again in the next clock cycle. The re-translation of architectural instructions wasted valuable processing cycles and consumed additional power. Furthermore, prior configurations did not store new microinstructions into a partially filled row of the spill buffer, leaving one or more empty and unused storage locations in the row. An empty storage location means that the storage location does not store a valid microinstruction. One or more empty storage locations left holes in the spill buffer. Such holes or unused storage locations within the spill buffer led to inefficient processing (e.g., such as by the RAT or other pre-execution logic).

SUMMARY OF THE INVENTION

A compressing instruction queue for a microprocessor according to one embodiment include a storage queue and a redirect logic circuit. The storage queue includes a folded matrix of storage locations including N rows and M columns for storing microinstructions of the microprocessor in sequential order. The storage queue can be folded because it is written and read in order and written consecutively. The redirect logic circuit is configured to receive and write multiple microinstructions per cycle of a clock signal into sequential storage locations of the storage queue without leaving unused storage locations and beginning at a first available storage location in the storage queue.

In one embodiment, the redirect logic circuit performs redirection and compression of the microinstructions based on a location of the first available storage location. Thus, for example, when there are more microinstructions than can be stored in the current row, the additional microinstructions are stored beginning with the first column of the next row. The process of redirecting into a storage queue reduces the number of write ports coupled to each storage location of the storage queue. Folding the storage queue reduces the number of write ports per column since the number of rows that may be written per column is limited to a predetermined number, such as 2 writes per row. The redirect logic circuit may include multiple levels of multiplexers, including a first level for selecting valid microinstructions based on position, and a second level for redirecting the microinstructions to the write ports. The multiplexer levels may be combined into a single level for more efficient operation.

A microprocessor according to one embodiment includes an instruction translator, a compressing instruction queue, and a processing logic circuit. The instruction translator is configured to translate one or more architectural instructions and to provide corresponding microinstructions per clock cycle of a clock signal. The compressing instruction queue includes a storage queue and a redirect logic circuit. The storage queue may include a matrix of storage locations for storing microinstructions from the instruction translator in a sequential order. The redirect logic circuit is configured to receive and write the received microinstructions per cycle of a clock signal into sequential storage locations of the storage queue without leaving unused storage locations and beginning at a first available storage location in the storage queue. The processing logic circuit is configured to receive and process microinstructions from said storage queue one row at a time in program order in a clock cycle.

A method of compressing microinstructions into an instruction queue of a microprocessor includes receiving up to P microinstructions from an instruction translator in a clock cycle of a clock signal, determining a first available storage location of a storage queue comprising a matrix of storage locations including N rows and M columns for storing microinstructions in sequential order, and redirecting the up to P microinstructions per clock cycle towards sequential storage locations of the storage queue in sequential order beginning at the first available storage location without leaving unused storage locations in the storage queue.

BRIEF DESCRIPTION OF THE DRAWINGS

The benefits, features, and advantages of the present invention will become better understood with regard to the following description, and accompanying drawings where.

DETAILED DESCRIPTION

It is desired to improve the process of translating and queuing architectural instructions into microinstructions for execution by a microprocessor. The inventors have recognized the inefficiencies associated with previous translation processes and configurations. The inventors have therefore developed a compressing instruction queue that provides more efficient instruction translation, queuing and processing. The microinstructions output from the translator are redirected and written into a compressing instruction queue thereby avoiding unused storage locations or holes in the queue. The compressing instruction queue increases the availability of microinstructions to subsequent execution units, thereby potentially improving the throughput of the microprocessor. The compressing instruction queue also reduces power consumption and saves valuable processing cycles by substantially reducing re-translation of architectural instructions.

Figure 1:
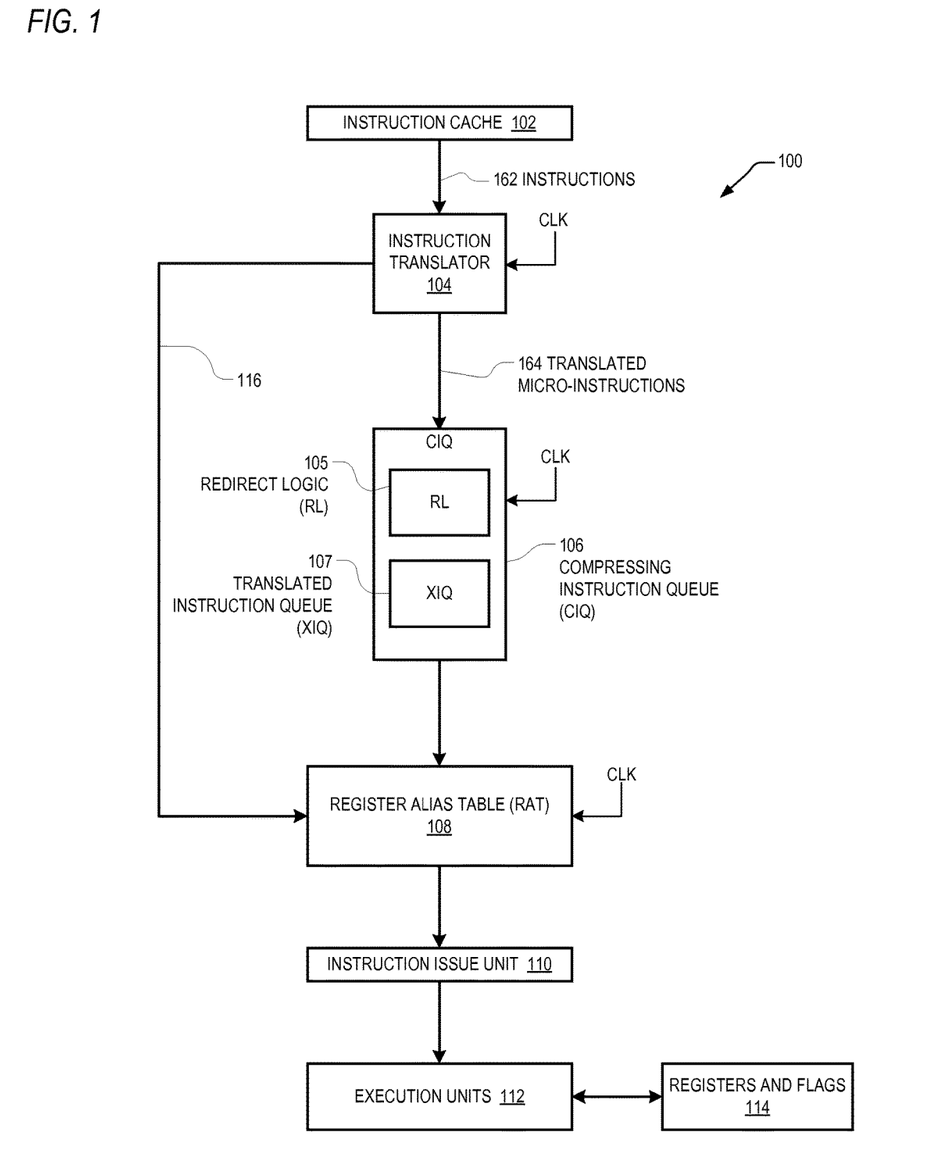
FIG. 1 is a simplified block diagram illustrating a portion of a microprocessor according to one embodiment of the present invention.

FIG. 1 is a simplified block diagram illustrating a portion of a microprocessor 100 according to one embodiment of the present invention. The microprocessor 100 includes an instruction cache 102 coupled and configured to provide architectural instructions 162 to an instruction translator 104. The instruction translator 104 translates one or more of the architectural instructions 162 into translated microinstructions 164, which are provided to a compressing instruction queue (CIQ) 106 implemented according to an embodiment of the present invention. The CIQ 106 stores and forwards the microinstructions 164 to a register alias table (RAT) 108. The RAT 108 generates additional information for the microinstructions, and sends the microinstructions and other information to an instruction issue unit 110. The instruction issue unit 110 issues instructions to the execution units 112 for execution. The microprocessor 100 also includes architectural registers, temporary registers, and flags and the like (registers and flags) 114 coupled to provide operands to, and to receive results from, the execution units 112. The results from the execution units 112 are also forwarded to the execution units 112 via forwarding buses or the like.

A clock signal CLK is shown provided to the instruction translator 104, the CIQ 106 and the RAT 108. CLK (or versions thereof) may be provided to these and other devices and systems of the microprocessor 100, such as the instruction cache 102, the instruction issue unit 110, the execution units 112, etc. As appreciated by those of ordinary skill in the art, multiple clock signals with the same or different frequencies may be generated and distributed to various devices and systems. In the illustrated embodiment, the instruction translator 104, the CIQ 106 and the RAT 108 are generally synchronized with each other via CLK or variations thereof.

It is understood that the configuration illustrated in FIG. 1 is simplified and that many details that are not necessary for a complete understanding of the present invention are not provided. The instruction cache 102 caches architectural instructions 162 from a system memory (not shown), in which the architectural instructions may be defined by an ISA of the microprocessor 100. In one embodiment, the microprocessor 100 supports multiple instruction set architectures, such as both the x86 ISA by Intel and the Advanced RISC Machines (ARMC)) ISA. Thus, the cached instructions 162 may be instructions defined by one or both of the x86 and ARM instruction sets. It is appreciated, however, that any number of instruction set architectures (one or more) may be supported. In one embodiment, more complex architectural instructions may be forwarded by the instruction translator 104 to a microcode unit or the like (not shown), which separately processes the instructions into additional microinstructions provided to the RAT 108. Some architectural instructions may not need translation and may be provided directly to the RAT 108, such as via path 116. The execution units 112 may include integer units, floating point units, media units, branch units, and load/store units, for example, that execute the microinstructions. Information generated by the execution units 112 may be provided back to prior units, such as to the instruction translator 104, the CIQ 106, the RAT 108, the instruction issue unit 110, etc.

In the illustrated embodiment, the CIQ 106 includes redirect logic (RL) 105 and a translated instruction queue (XIQ) 107. In one embodiment, the instruction translator 104 outputs up to six (0-6) microinstructions per clock cycle (e.g., cycles of CLK), which are provided to inputs of the redirect logic 105. The redirect logic 105 fills storage locations of the XIQ 107 with the microinstructions provided from the instruction translator 104. As further described herein, the redirect logic 105 and the XIQ 107 are configured such that up to all six microinstructions output from the instruction translator 104 may be stored within the XIQ 107 in each clock cycle. The redirect logic 105 performs this process without leaving holes (or empty and unused storage locations) within the XIQ 107, thereby improving microprocessor performance and utilization. Furthermore, the CIQ 106 is able to receive and store a greater number of microinstructions in any given clock cycle, thus substantially reducing the number of occasions in which the architectural instructions are re-translated in subsequent clock cycles. In this manner, a greater number of architectural instructions may be processed over time on average, and processing cycles associated with instruction translation and corresponding power usage are reduced. The configuration of the CIQ 106 increases the availability of microinstructions to the execution units 112, which potentially improves the overall throughput and efficiency of the microprocessor 100.

Figure 2:
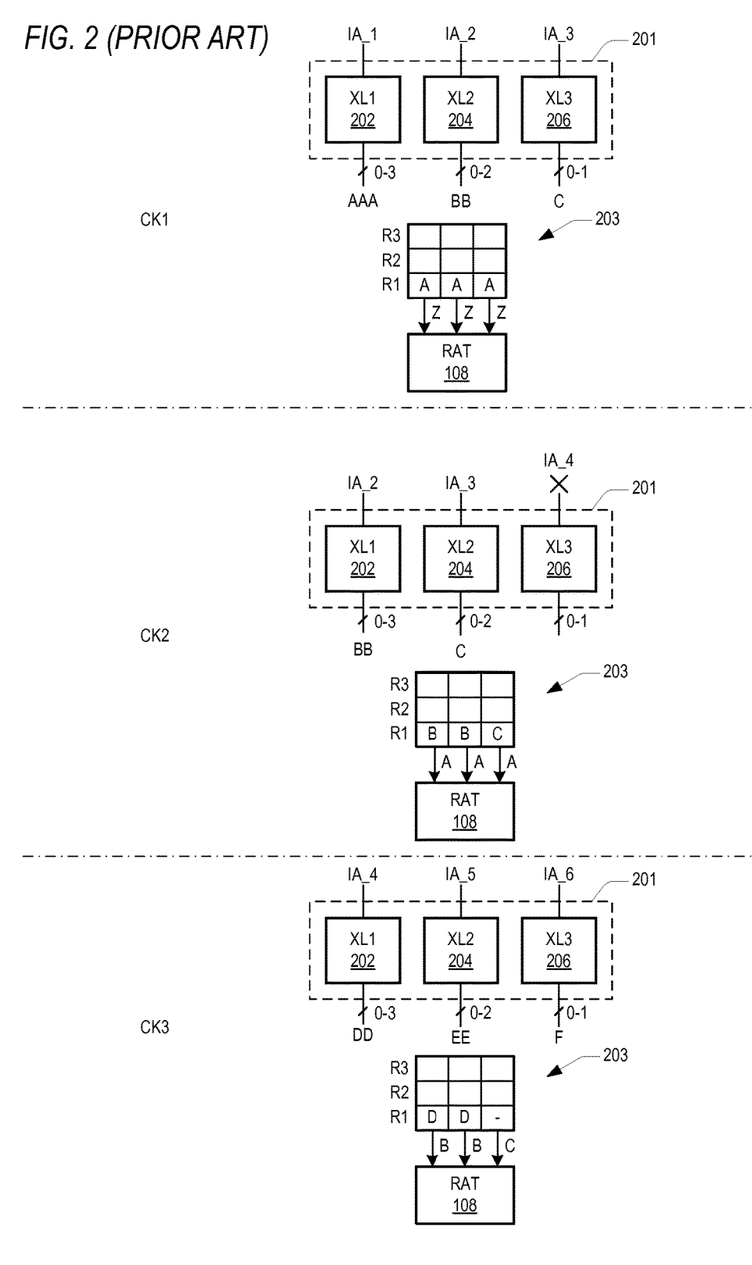
FIG. 2 is a simplified figurative block diagram illustrating a process of a translator filling a spill buffer in consecutive clock cycles of a clock signal according to a prior art configuration.

FIG. 2 is a simplified figurative block diagram illustrating a process of a translator 201 filling a spill buffer 203 in consecutive clock cycles CK1, CK2 and CK3 of CLK according to a prior art configuration. The translator 201 is configured as 3 separate translators XL1 202, XL2 204 and XL3 206, in which the first translator XL1 202 is capable of receiving one architectural instruction and outputting up to 3 (0-3) microinstructions (a.k.a, micro-operations or "micro-ops", denoted herein simply as "uops"), the second translator XL2 204 is capable of receiving one architectural instruction and outputting up to 2 (0-2) uops, and the third translator XL3 206 is capable of receiving one architectural instruction and outputting up to 1 (0-1) uop.

In the prior configuration as shown in FIG. 2, the spill buffer 203 is placed just before or at the head end of the RAT 108. In the illustrated configuration, the spill buffer 203 is a matrix of storage locations including 3 rows and 3 columns, in which the rows are labeled R1, R2 and R3. The spill buffer 203 is operated like a first-in, first-out (FIFO) buffer. In each clock cycle, up to 3 uops from the translators XL1-XL3 are stored in the next row of empty storage locations of the spill buffer 203, and the RAT 108 retrieves the "oldest" row of uops stored in the spill buffer 203. In this manner, the spill buffer 203 effectively decouples operation of the translators XL1-XL3 from operation of the RAT 108. In the illustrated embodiment, the translators XL1-XL3 may store the next set of uops in the same row of the spill buffer 203 that is being emptied by the RAT 108. In the illustration of FIG. 2, it is assumed that the RAT 108 retrieves from a row (e.g., row R1) while the translators XL1-XL3 store in the same row for seamless operation. During actual operation, the RAT 108 may be unable to process the next row of entries, in which case the translators XL1-XL3 store the next set of uops in the next empty row. Also, there may be clock cycles in which the translators XL1-XL3 do not output any uops (i.e., 0 uops).

The figurative block diagram of FIG. 2 is simplified in some respects. For example, for purposes of simplicity of illustration, the process of fusion is not explicitly shown or illustrated. Fusion is the process in which two or more architectural instructions may be combined and/or uops and/or source information and the like shared by the translators during the translation process. Fusion thus causes the translators XL1, XL2 and XL3 to output a modified translated pattern of uops depending upon how the architectural instructions are combined. For example, two architectural instructions which might independently produce 2 uops each might instead be fused to produce only 1, 2 or 3 uops depending upon the particular combination. Similarly, 3 architectural instructions provided to the translators XL1, XL2 and XL3 that might independently produce 1, 2 and 1 uops, respectively, might instead be fused to produce a different pattern of uops depending upon the particular pattern of architectural instructions, such as 0, 1 and 1 uops, 1, 1 and 1 uops, etc. The process of fusion, however, does not change the fact that during any given clock cycle, the collective operation of the translators XL1, XL2 and XL3 produces from 0 uops up to 6 uops in any of many different uop combinations at the translator outputs. Regardless of the combination, the translator outputs are in program order (e.g., from left to right or from XL1 to XL3).

In the first clock cycle CK1, a first architectural instruction IA_1 is provided to an input of the first translator XL1 202, which outputs 3 uops shown as AAA. Also, a second architectural instruction IA_2 is provided to an input of the second translator XL2 204 which outputs 2 uops BB, and a third architectural instruction IA_3 is provided to an input of the third translator XL3 206 which outputs one uop C. In this manner, the translators XL1-XL3 output a full set of 6 uops AAA, BB and C. The spill buffer 203, however, is only able to accept and store up to 3 uops at a time in a single row. A set of previously translated uops ZZZ are retrieved from the spill buffer 203 and processed by the RAT 108, and the uops AAA are stored in row R1. The translated uops BB and C in the first clock cycle are discarded resulting in wasted processing cycles and additional consumption of power.

The uops of translated architectural instructions that are not stored in the spill buffer 203 in one clock cycle cause the architectural instructions to be shifted through the translators XL1-XL3 in the next clock cycle. In this manner, the architectural instructions IA_2 and IA_3 are shifted to the inputs of the translators XL1 and XL2, respectively, in the second clock cycle CK2. The next architectural instruction is shown as IA_4, which would be provided to the input of the next available translator XL3. In the illustrated example, however, the instruction IA_4 would otherwise cause a translated output of at least 2 uops at the output of the third translator XL3 206, which is beyond its capacity. In this manner, only IA_2 and IA_3 are translated by translators XL1 and XL2 providing uops BB and C, respectively. The previously translated uops AAA are retrieved from row R1 from the spill buffer 203 and processed by the RAT 108, and the uops BBC are stored in row R1 in clock cycle CK2.

In the next clock cycle CK3, the previously translated uops BBC are retrieved from row R1 from the spill buffer 203 and processed by the RAT 108. Also, IA_4 is shifted to the input of the translator XL1, which outputs uops DD, the next architectural instruction IA_5 is provided to the input of the second translator XL2 204, which outputs uops EE, and the next architectural instruction IA_6 is provided to the input of the third translator XL3 206, which outputs uop F. The uops DD are stored in row R1. The next two uops EE, however, cannot be both stored in row R1 since only one more location is left and the prior configuration was limited to storing a single row in any given clock cycle. In this manner, the uops EE and F are discarded in clock cycle CK3 and IA_5 and IA_6 must be shifted and retranslated in the next clock cycle CK4 (not shown). Thus, the third column of row R1 has a non-entry or hole denoted with a dash "-". In this manner, only uops DD are available for processing by the RAT 108 in the next clock cycle CK4. Also, instructions IA_5 and IA_6 are shifted to the translators XL1 and XL2 and re-translated in the next clock cycle, in which the translation of uops EE and F in clock cycle CK3 represent wasted processing cycles.

In summary, even though the translators XL1-XL3 collectively may output up to 6 uops per clock cycle, the inefficiency associated with the spill buffer 203 results in inefficient processing throughput and wasted processing cycles. It takes three clock cycles to translate four x86 instructions IA_1, IA_2, IA_3, and IA_4, in which the initial translations of instructions IA_2, IA_3, IA_5, and IA_6 cause wasted processing cycles, instruction IA_4 is delayed by one clock cycle, and at least one hole occurs in the spill buffer 203 (as shown in clock cycle CK3). Although not shown, in many clock cycles, the translators XL1-XL3 output only 1 or 2 uops leaving additional holes or unused storage locations in the spill buffer 203. In contrast, the redirect logic 105 and the XIQ 107 of the CIQ 106 as further described herein are configured to significantly reduce wasted processing cycles of the translator and reduce or even eliminate holes in the XIQ 107 thereby improving instruction processing throughput.

Figure 3:
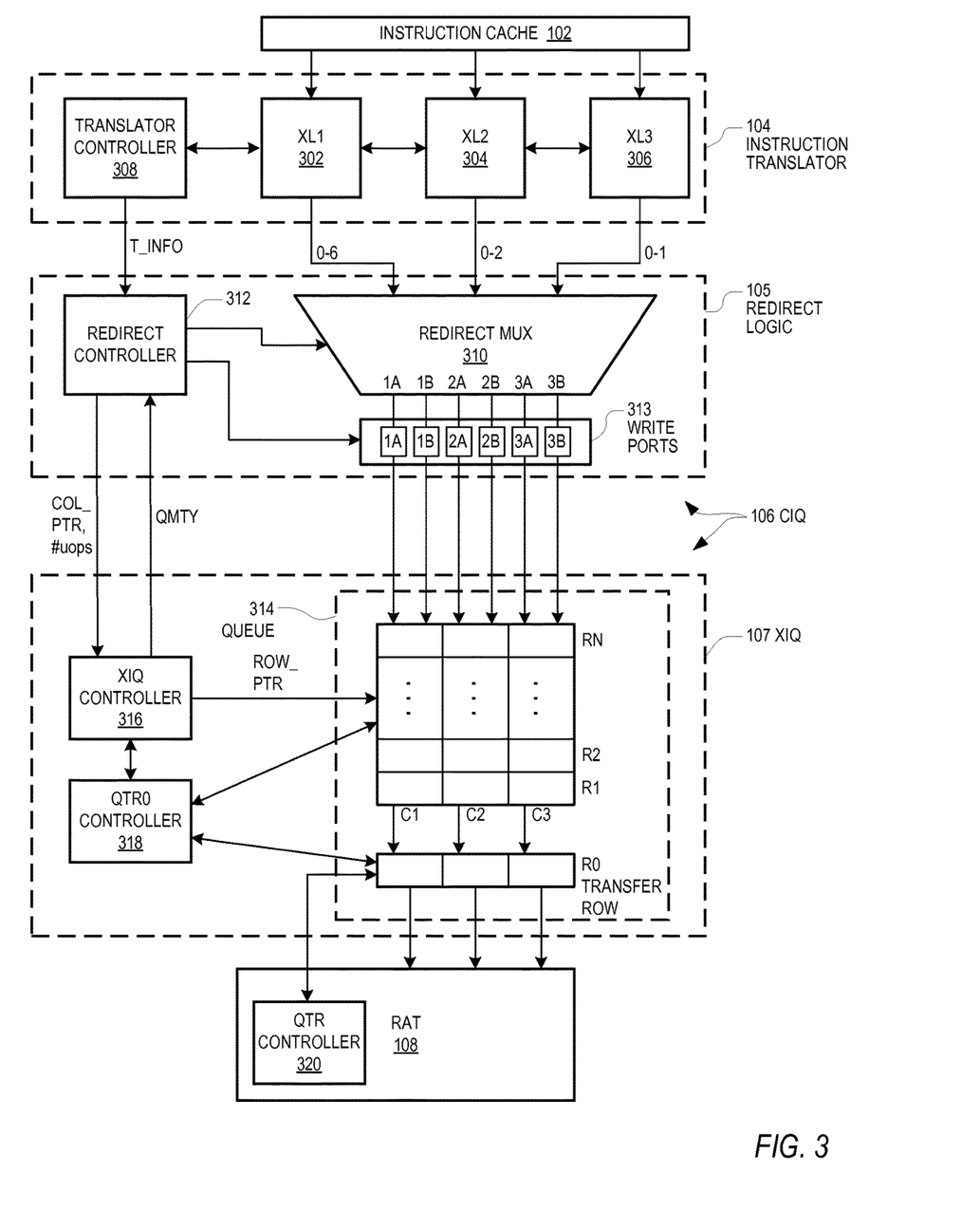
FIG. 3 is a more detailed block diagram of the translator and a CIQ (compressing instruction queue) positioned between and interfaced with the instruction cache and a RAT (register alias table) of FIG. 1 according to one embodiment of the present invention.

FIG. 3 is a more detailed block diagram of the translator 104 and the CIQ 106 (including the redirect logic 105 and the XIQ 107) positioned between and interfaced with the instruction cache 102 and the RAT 108 according to one embodiment of the present invention. The translator 104 includes three separate translators XL1 302, XL2 304 and XL3 306 and a translator controller 308. For purposes of the present disclosure, the translators XL1-XL3 operate in a similar fashion as those of the conventional configuration shown in FIG. 2, except that the first translator XL1 302 may output up to 6 uops (e.g., from 0 to 6 uops) per clock cycle. XL2 outputs 0-2 and XL3 outputs 0-1 uops per clock cycle. The translator controller 308 facilitates control of the translation process, and further reports translation information T_INFO to a redirect controller 312 of the redirect logic 105. The reported translation information T_INFO at least includes the number of uops output by each of the translators XL1-XL3 for each clock cycle.

The redirect logic 105 includes redirect multiplexer (MUX) 310, the redirect controller 312 and a set of write ports 313. In the illustrated embodiment, the redirect MUX 310 has inputs receiving the uops provided by the translators XL1-XL3, and has outputs providing each received uop to an input of one of the write ports 313. As described further herein, the redirect controller 312 is provided information regarding the number and location of the uops output from the instruction translator 104, and at least a column indication for the next available empty storage location in the XIQ 107. The redirect controller 312 controls the redirect MUX 310 to redirect or otherwise reorganize each of the received uops to one of the write ports 313 in order to write the uops in program order into the next set of empty storage locations of the XIQ 107. The redirect controller 312 controls the port mapping of uops provided to the write ports 313, and may also control the write timing by the write ports 313 to the XIQ 107. The redirect controller 312 further cooperates with control logic in the XIQ 107 to write valid uops to the appropriate storage locations of the XIQ 107 in program order as further described herein.

The XIQ 107 includes a storage queue 314, an XIQ controller 316, and a queue-to-row-zero (QTR0) controller 318. The storage queue 314 includes a primary storage organized as a matrix of storage locations with a number N rows R1, R2, ..., RN, and three columns C1, C2 and C3. Although only 3 columns are shown, it is understood that any suitable integer number "M" of columns may be included. In the illustrated embodiment, the RAT 108 is configured to receive and process up to a maximum number uops at a time per clock cycle, in which the number of columns of the storage queue 314 corresponds with the maximum number.

The storage queue 314 also includes a separate read path, shown as a transfer row R0, in which each row read out from the queue 314 into the RAT 108 passes through the transfer row R0. The XIQ controller 316 cooperates with the redirect controller 312 to locate the next set of empty storage locations for storing the uops. The QTR0 controller 318 separately controls transfer of a row of entries from the primary storage (rows R1-RN) to the transfer row R0 for transfer to the RAT 108. A separate queue-to-RAT (QTR) controller 320 is shown within the RAT 108 for transferring entries from the transfer row R0 to the RAT 108. When valid entries are stored within transfer row R0 and when the RAT 108 is able to receive them, the QTR controller 320 transfers the uops to the RAT 108.

In one embodiment, if the queue 314 is empty and the transfer row R0 is empty or otherwise being simultaneously emptied (i.e., during the same clock cycle), then the next up to 3 uops may be written by the write ports 313 directly to the transfer row R0 in the same clock cycle. Alternatively, the redirect MUX 310 writes directly to locations within the queue 314, and the QTR0 controller 318 enables up to 3 of the entries to be written through to the transfer row R0 in the same clock cycle. The storage locations directly written by uops that are also written through to the transfer row R0 may still be considered empty and available for subsequent writes.

It is noted that the block diagram is simplified in that many variations or complications are not explicitly shown. For example, some architectural instructions or parts thereof may be transferred from the instruction cache 102 or the translator 104 directly to RAT 108 as shown by path 116 in FIG. 1. The translator 104 also performs fusion of architectural instructions such that the number and pattern of uops may be modified relative to independent translation of the instructions. As previously noted, however, the translator controller 308 conveys the resultant number and location of the actual uops produced to the redirect controller 312, which then redirects the uops to sequential storage locations within the XIQ 107 in program order. Also, some fields of the instructions may come directly from the instruction cache 102 or from alternative locations (not shown). Various control logic ensures that each uop is provided with proper field and/or status information as understood by those of ordinary skill in the art.

As shown in FIG. 3, the instruction translator 104 may output up to 9 uops (6 from XL1, 2 from XL2 and 1 from XL1). In a more general configuration, an instruction translator may have any suitable number Q outputs. In one embodiment, the redirect logic 105 is configured to receive up to 6 uops from the translators XL1-XL3 and outputs the received uops to the XIQ 107. Although only up to 6 uops may be received and processed in the illustrated configuration, it is understood that any suitable integer number "P" of uops may be received depending upon the particular implementation. It is noted that since the translator XL1 302 can process architectural instructions that generate up to 6 uops, and since the redirect MUX 310 is configured to receive up to 6 uops, that fewer instructions are relegated to a relatively slow read only memory (ROM) (not shown). In prior configurations, any architectural instruction that generated more than 3 uops was sent to the ROM. In the illustrated configurations, any architectural instruction that generates more than 6 uops may be sent to the ROM. In one embodiment, the microprocessor 100 incorporates a superscalar, out-of-order pipeline (not shown) in which uops may be executed in an order that deviates from architectural instruction order to improve overall processing throughput. Such out-of-order execution, however, begins after the RAT 108, such as in the instruction issue unit 110 or thereafter. The uops output from the translators XL1-XL3 are provided in program order, which is from left to right or from XL1 to XL3. The uops are then stored in the queue 314 in program order. In this manner, any uops from XL1 are ordered first, any uops from XL2 are next, and any uop from XL3 is last.

The program order for the queue 314 is from left to right (columns C1 to C3) and from bottom to top (rows R1 to RN) from the perspective of the diagram of FIG. 3. The rows, however, wrap around in circular buffer fashion in which the rows wrap back around to row R1 from RN. The uops are stored in program order in a zigzag pattern from column C1 to C3 in the current row and then C1 to C3 in the next row and so on. Since the first available or empty location within the queue 314 may not be located in the first column, the redirect controller 312 controls the redirect MUX 310 to redirect the uops to begin at the first empty location. According to redirection and compression operation, the first uops output from the instruction translator 104 are redirected to the write ports 313 to fill the current row and then remaining uops are redirected back to the first column of the next row. The RAT 108 processes the received uops in program order in which it retrieves one row at a time in the same order (R1-RN which wraps back to R1), and processes the uops in column order C1-C3.

In the illustrated embodiment, each output of the redirect MUX 310 and the corresponding write port 313 is numbered 1A and 1B for the first column C1, 2A and 2B for the second column C2, and 3A and 3B for the third column C3 of the queue 314. Thus, the 6 write ports 1A, 1B, 2A, 2B, 3A and 3B include 2 write ports (A and B) for each column C1 to C3 of the queue 314. In this manner, rather than writing only 0-1 uops per column, the redirect MUX 310 writes up to two uops (0-2 uops) per column of the queue 314. Also, even though any uop output from the instruction translator 104 may be stored at any storage location within queue 314, which might otherwise require 9 write ports per storage location, the configuration and operation of the redirect logic 105 enables each storage location within the queue 314 to have only 2 write ports. Each "A" port writes to a first storage location and each "B" port writes to the second storage location of the corresponding column. The first of the up to 6 received uops is provided to one of the "A" ports, in which the particular first column depends upon the location of the first available empty storage location. The remaining uops are provided to the remaining write ports in program order.

The first empty storage location may be located in any one of the 3 columns C1 to C3, and the up to 6 uops are then written in order to the next up to 6 sequential empty storage locations. The XIQ controller 316 maintains a row pointer ROW_PTR that identifies the row containing the next empty storage location within the queue 314. The redirect controller 312 maintains a column pointer COL_PTR that identifies the column containing the next empty storage location within the queue 314, and shares the COL_PRT with the XIQ controller 316.

In the illustrated embodiment, the redirect controller 312 also provides an indication of the number of uops actually being written, shown as #uops, which enables the XIQ controller 316 to properly update the ROW_PTR after a write operation. The XIQ controller 316 also communicates with the QTR0 controller 318 when a row is transferred from the queue 314 into the transfer row R0 for transfer to the RAT 108. The XIQ controller 316 shares information with the redirect controller 312, including a QMTY parameter that informs the redirect controller 312 that the queue 314 is empty. When QMTY indicates that the queue 314 is empty, the redirect controller 312 resets COL_PTR to the first column C1. The XIQ controller 316 remains updated regarding the "addresses" or row/column locations of the next sequential set of empty storage locations within the queue 314 for storing the uops output from the write ports 313.

In summary, the redirect controller 312 maintains and updates the COL_PTR and controls the redirect MUX 310 to redirect uops provided from the translators XL1-XL3 to the write ports 313. The redirect controller 312 also enables and controls timing of the write ports 313 to write valid uops into the queue 314. The collective operation of the redirect controller and the redirect MUX 310 reduces the number of write ports to two (rather than 9) for each storage location of the queue 314. The XIQ controller 316 and the QTR0 controller 318 collectively maintain and update the ROW_PTR. The XIQ controller 316 uses the ROW_PTR, the COL_PTR and the number of valid uops to control the writing of the uops into the next set of empty storage locations of the queue 314. In this manner, the redirect logic 105 and the XIQ 107 collectively redirect and write the uops into empty storage locations of the queue 314 in program order and in such a manner as to "compress" the uops into the queue 314 without leaving holes or unused storage locations.

Figure 4:
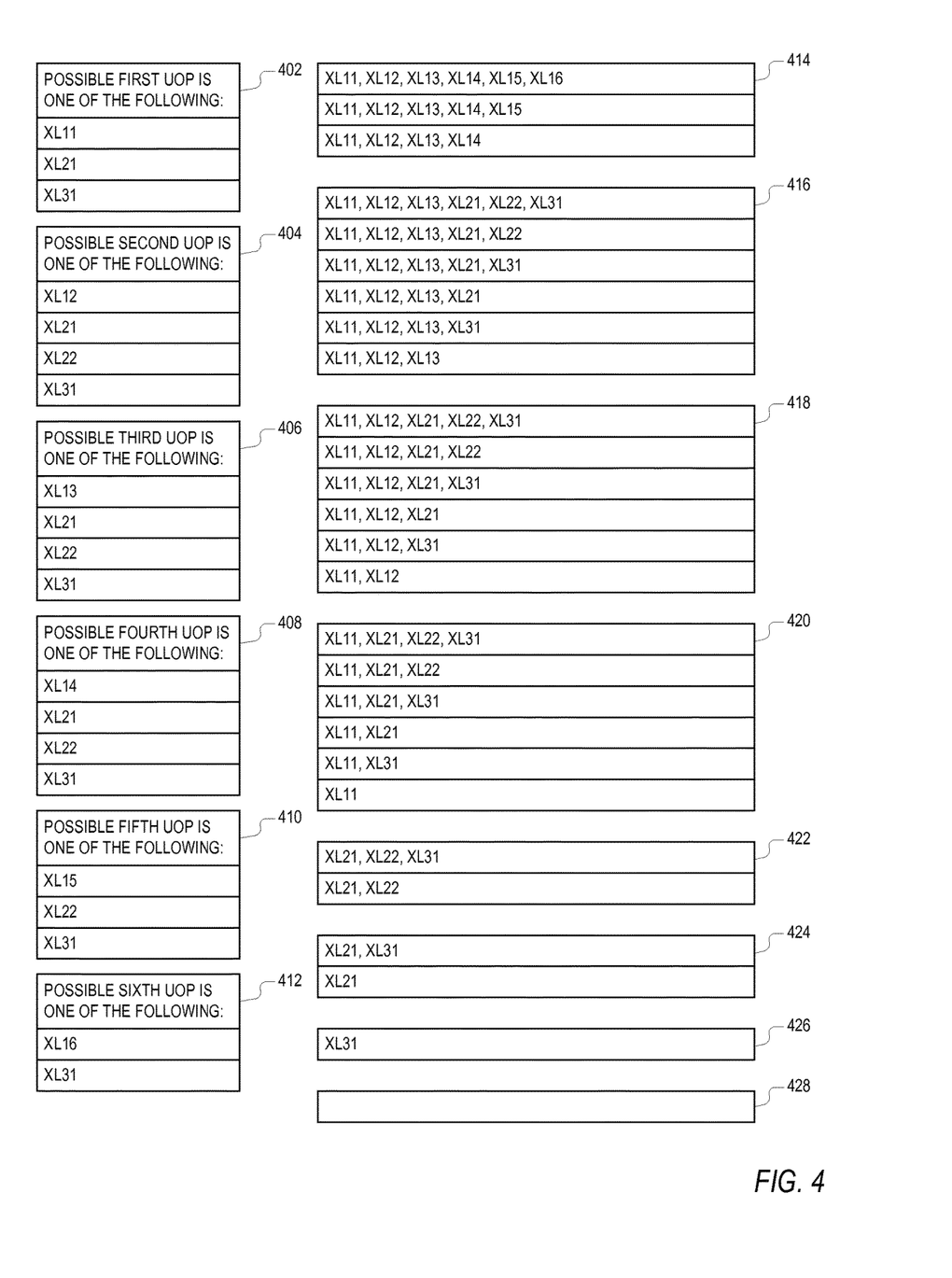
FIG. 4 is a tabular diagram illustrating the allowed uop combinations at the outputs of the translators XL1-XL3 of FIG. 3 for each clock cycle according to one embodiment of the present invention.

FIG. 4 is a tabular diagram illustrating the allowed uop combinations at the outputs of the translators XL1-XL3 of FIG. 3 for each clock cycle according to one embodiment of the present invention. The uops output from the first translator XL1 302 are denoted, from left (or first) to right (or last), XL11, XL12, XL13, XL14, XL15 and XL16. The uops output from the second translator XL2 304 are denoted XL21 (first) and XL22 (last). The uop output from the third translator XL3 306 is denoted XL31. In this particular embodiment, if the first translator XL1 outputs more than 3 uops, then any uops from the second and third translators XL2 and XL3 are discarded. Tables 402, 404, 406, 408, 410 and 412 identify which of the uops are allowed to take the first through sixth positions, respectively, for a total of up to six uops output from the instruction translator 104 in program order.

As shown by table 402, the first uop, if any, may be any one of XL11, XL21 or XL31. As shown by table 404, the second uop, if any, may be one of XL12, XL21, XL22 or XL31. As shown by table 406, the third uop, if any, may be one of XL13, XL21, XL22 or XL31. As shown by table 408, the fourth uop, if any, may be one of XL14, XL21, XL22 or XL31. As shown by table 410, the fifth uop, if any, may be one of XL15, XL22 or XL31. As shown by table 412, the sixth uop, if any, may be one of XL16 or XL31.

The additional tables 414, 416, 418, 420, 422, 424, 426 and 428 list the allowed uop combinations at the outputs of the translators XL1-XL3 based on the allowed uop position numbers from the tables 402-412. Table 414 lists the allowed uop combinations when the first translator XL1 outputs 4, 5 or 6 uops. In this case, translator XL1 is the sole provider of uops in that clock cycle in which any uops output from the translators XL2 and XL3 are discarded. Table 416 lists the allowed uop combinations when the first translator XL1 outputs 3 uops XL11, XL12 and XL13, in which any additional uops from the translators XL2 and/or XL3 are included. In this case the translators XL1-XL3 output a total of 3 to 6 uops as shown. Table 418 lists the allowed uop combinations when the first translator XL1 outputs 2 uops XL11 and XL12, in which any additional uops from the translators XL2 and/or XL3 are included. In this case the translators XL1-XL3 output a total of 2 to 5 uops as shown. Table 420 lists the allowed uop combinations when the first translator XL1 outputs only 1 uop XL11, in which any additional uops from the translators XL2 and/or XL3 are included. In this case the translators XL1-XL3 output a total of 1 to 4 uops as shown.

Tables 422, 424 and 426 list the allowed uop combinations when the first translator XL1 outputs 0 uops. In table 422, translator XL2 outputs 2 uops XL21 and XL22 and XL3 outputs either 0 or 1 uop, in table 424, translator XL2 outputs only 1 uop XL21, and XL3 outputs either 0 or 1 uop, and in table 426, the only output is the sole output from XL3, or XL31. Table 428 is blank indicating the possibility that 0 uops may be produced in any given clock cycle.

The embodiment of FIG. 4 is simplified in that the allowed uop output combinations for up to 6 uops are limited as compared to the theoretically possible combinations. In particular as implied by table 414, when the first translator XL1 outputs 4 to 6 uops, then any uops from the second and third translators are discarded. Such configuration may increase the occasions in which re-translation is performed as compared to allowing all possible combinations for up to 6 uops. Such simplification, however, simplifies the circuitry and logic and thus provides an acceptable tradeoff between circuit complexity and re-translation.

In an alternative embodiment, when the first translator XL1 outputs 5 uops, then an additional uop may be allowed from XL2 (XL21) or from XL3 (XL31), and when the first translator XL1 outputs 4 uops, then an additional 2 uops may be allowed from XL2 (XL21 and XL22) or one each from XL2 (XL21) and XL3 (XL31).

Figure 5:
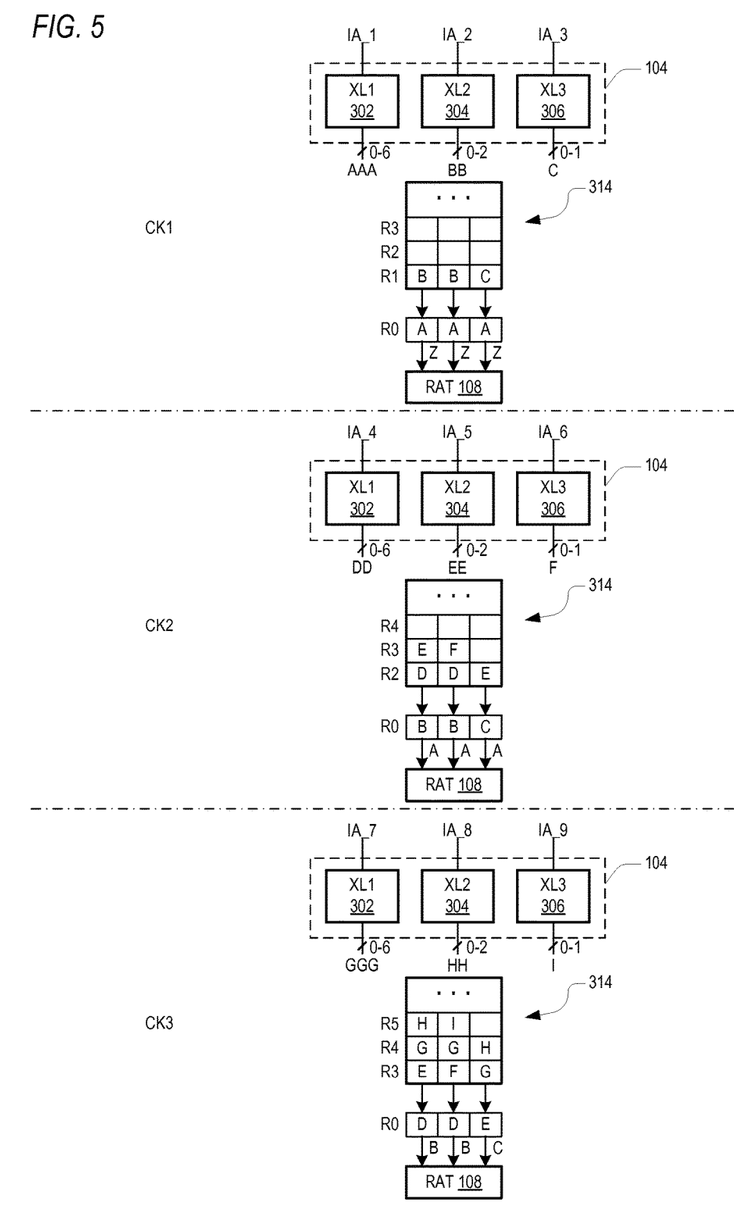
FIG. 5 is a simplified figurative block diagram illustrating a process of the translator of FIG. 1 filling the queue of FIG. 3 in consecutive clock cycles according to one embodiment of the present invention.

FIG. 5 is a simplified figurative block diagram illustrating a process of the translator 104 filling the queue 314 of the XIQ 107 in consecutive clock cycles CK1, CK2 and CK3 of CLK according to one embodiment of the present invention. The figurative block diagram of FIG. 5 is simplified in a similar manner as FIG. 2 in that the process of fusion is not explicitly shown or illustrated. Operation of the translator 104 is similar to the translator 201, except that the first translator XL1 302 may output up to 6 uops in any given clock cycle. Also, the redirect logic 105 is not shown, but its operation enables the queue 314 to be filled in the manner illustrated. The configuration and operation of the redirect logic 105 are more fully described herein.

In a similar manner as shown in FIG. 2, the architectural instructions IA_1, IA_2 and IA_3 are provided to the translators XL1, XL2 and XL3, which output the uops AAA, BB and C, respectively. A set of previously translated uops ZZZ are retrieved from the transfer row R0 and processed by the RAT 108. In this case, the queue 314 is able to receive and store up to 6 uops at a time for each clock cycle. Thus, the uops AAA are stored in the 3 storage locations of the transfer row R0, and the uops BB and C are stored in row R1 of the queue 314. It is noted that the uops BB and C from the first clock cycle CK1 are not discarded but instead are stored in the queue 314. In this manner, wasted processing cycles and additional consumption of power associated therewith are avoided since all of the uops generated by instructions IA_1-IA_3 are stored.

In the second clock cycle CK2, the next 3 architectural instructions IA_4, IA_5 and IA_6 are provided to the translators XL1, XL2 and XL3, which output the uops DD, EE and F, respectively. The uops AAA are provided to the RAT 108, the uops BBC are moved to the transfer row R0, and the uops DD, EE and F are stored in the queue 314 in rows R2 and R3. It is noted that the row numbers are shifted in the illustration since queue 314 is operated as a FIFO (e.g., row R1 is not shown in CK2). Thus, although row R1 remains in the queue 314, it becomes the "last" empty row after row RN. In this case for the clock cycle CK2, the architectural instructions do not have to wait until the third clock cycle CK3 but instead are translated in clock cycle CK2 and their corresponding uops DD, E and F are stored in the queue 314. Although this would appear to leave an unused empty location at row R3, column C3, this hole is filled in the next cycle.

In the third clock cycle CK3, the uops BBC are provided to the RAT 108, and the uops DDE are moved to the transfer row R0. Also, the next three architectural instructions IA_7, IA_8 and IA_9 are translated by the translators XL1, XL2 and XL3, which output uops GGG, HH and I, respectively. In this case, the first G uop is stored in the empty location at row R3, column C3 rather than leaving a storage hole, and the next two G uops are stored in the next row R4. Also, the first H uop is stored in the empty location at row R4, column C3 rather than leaving a storage hole, and the next H uop is stored in the next row R5 along with uop I. Although not shown, the next uop provided by the translators is in the next clock cycle CK4 stored in the last entry of row R4 at column C3.

In summary, since the redirect logic 105 is configured to place up to 6 uops in the queue 314 beginning at any storage location (any row and any column), holes or unused storage locations are reduced, minimized or even eliminated as compared to the prior configuration. Also, the amount of wasted processing cycles and corresponding wasted power are reduced or minimized. As shown in FIG. 5, for example, in the 3 clock cycles CK1-CK3 the uops AAA, BB, C, DD, EE, F, GGG, HH and I are stored in the queue 314 after being translated without necessitating re-translation.

It is noted that in some situations the instruction translator 104 may re-translate some architectural instructions. For example, in one embodiment, if the first translator XL1 302 outputs 6 uops, then any uops generated by the translators XL2 and XL3 are discarded and corresponding architectural instructions shifted in the next cycle for re-translation. In another embodiment, if the first translator XL1 302 outputs more than 3 uops, then any uops generated by the translators XL2 and XL3 are discarded and corresponding architectural instructions shifted in the next cycle for re-translation. Also, if a certain combination of architectural instructions might otherwise cause more than 2 uops from XL2 or more than 1 uop from XL3, then one or two architectural instructions may have to be shifted and translated in the next clock cycle. In many such cases, however, the queue 314 is likely to have stored uops for the RAT 108 so that the RAT 108 is less likely to be "starved" of uops for processing.

The queue 314 has a limited number of storage locations, and in some situations or under certain processor conditions may become full. For example, certain stall or delay conditions at the RAT 108 or further down the pipeline may cause the queue 314 to become full. In one embodiment, such conditions may be reported back to the translator controller 308 or the like in which translation is temporarily stopped to avoid wasted processing cycles. In one embodiment, for example, the XIQ controller 316 detects a full condition of the queue 314 and sends a stall signal to the translator controller 308 while the condition is true. The number of rows N of the queue 314 is optimized over most expected operating conditions. In one embodiment, for example, N=6 for a total of 6 rows R1-R6 (not including the transfer row R0).

Figure 6:
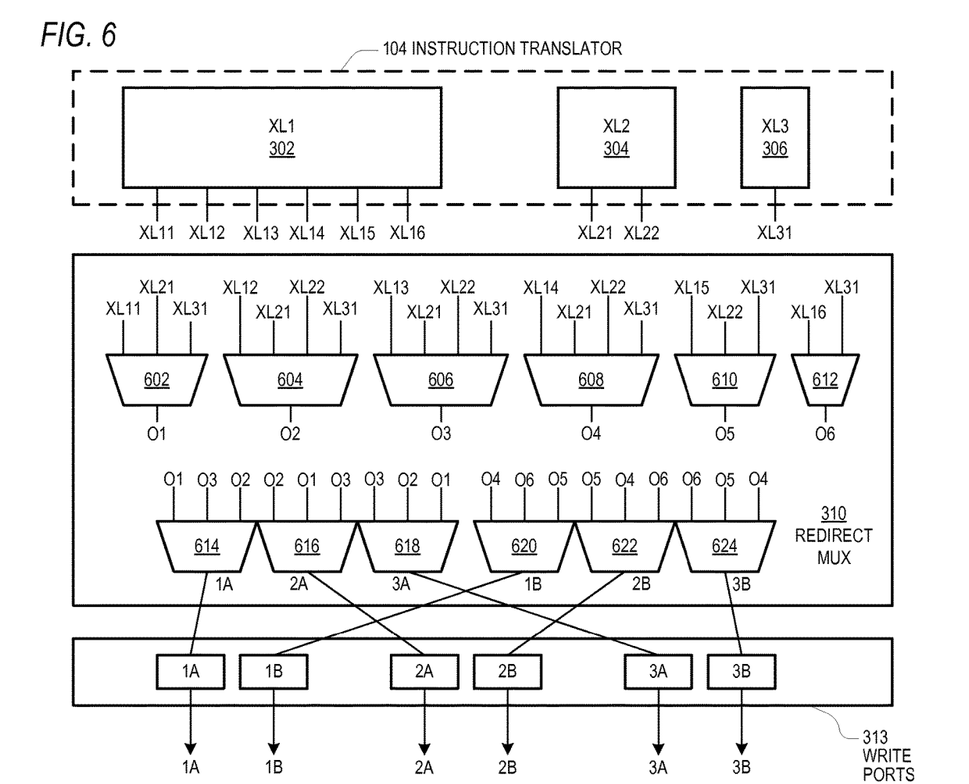
FIG. 6 is a simplified block diagram of the outputs of each of the translators XL1-XL3, the redirect multiplexer and the write ports of FIG. 3 according to one embodiment of the present invention.

FIG. 6 is a simplified block diagram of the outputs of each of the translators XL1-XL3 of the translator 104, the redirect MUX 310 and the write ports 313 according to one embodiment of the present invention. As described above with reference to FIGS. 3 and 4, the first translator XL1 302 may output uops XL11-XL16, the second translator XL2 304 may output uops XL21-XL22, and the third translator XL3 306 may output uop XL31. These are shown in FIG. 6 as separate outputs of the translators XL1-XL3. These outputs are provided, via corresponding conductive traces or the like, to corresponding inputs of the redirect MUX 310. In the illustrated embodiment, the redirect MUX 310 includes a first tier of multiplexers (MUXs) 602, 604, 606, 608, 610 and 612, and a second tier of MUXs 614, 616, 618, 620, 622 and 624. The MUX 612 is a 2:1 MUX, the MUXs 602 and 610 and each of the MUXs 614-624 are 3:1 MUXs, and the MUXs 604, 606, and 608 are 4:1 MUXs.

As previously described, each of the MUXs 602-624 and each of the write ports 313 are controlled by the redirect controller 312. Each of the MUXs 602-624, for example, include one or more select inputs provided by the redirect controller 312 for selecting and providing one of its inputs to its output. Selection is based on which uops are valid and the particular uop combination provided by the translators XL1-XL3. The redirect controller 312 also enables the write ports 313 to write valid uops to the next sequential series of empty storage locations in the queue 314 in program order. It is noted that the redirect controller 312 does not enable any write port that receives an invalid uop in any given clock cycle.

The first tier of MUXs 602-612 effectively implement the tables 402-412, respectively, and provide up to six output uops on corresponding outputs O1, O2, O3, O4, O5 and O6. As shown, according to table 402, the first uop is one of XL11, XL12 and XL31, which are the inputs to the first MUX 602 providing a first uop at output P1. Also, according to table 404, the second uop is one of XL12, XL21, XL22 and XL31, which are the inputs to the second MUX 604 providing a second uop at output O2. The third uop is one of XL13, XL21, XL22 and XL31, which are the inputs to the third MUX 606 providing a third uop at output O3. The fourth uop is one of XL14, XL21, XL22 and XL31, which are the inputs to the fourth MUX 608 providing a fourth uop at output O4. The fifth uop is one of XL15, XL22 and XL31, which are the inputs to the fifth MUX 610 providing a fifth uop at output O5. The sixth uop is one of XL16 and XL31, which are the inputs to the sixth MUX 612 providing a sixth uop at output O6.

The outputs O1, O2 and O3 are each provided to a corresponding input of each of the MUXs 614, 616 and 618 providing outputs 1A, 2A and 3A, respectively. Similarly, the outputs O4, O5 and O6 are each provided to a corresponding input of each of MUXs 620, 622 and 624 providing outputs 1B, 2B and 3B, respectively. Each of the outputs 1A-3B of the MUXs 614-624 is provided to a corresponding one of the write ports 313 individually labeled 1A, 1B, 2A, 2B, 3A and 3B, respectively, for providing the outputs 1A-3B to the queue 314.

As previously described, the translator controller 308 informs the redirect controller 312 the number and position of the uops at the outputs of the translator 104, such as according to the allowed combinations shown in the tables 414, 416, 418, 420, 422, 424, 426 and 428 of FIG. 4. The redirect controller 312 controls the MUXs 602 to 612 to provide the up to 6 uops in order on outputs O1-O6. If only one uop is output, it is provided on output O1, if two uops are output, they are provided in order on outputs O1 and O2, if three uops are output, they are provided in order on outputs O1, O2 and O3, and so on.

The redirect controller 312 further controls the MUXs 614-624 based on the column pointer COL_PTR to redirect the up to 6 uops on the outputs O1-O6 to the outputs 1A-3B. Although the MUXs 614-624 may be independently controlled, they may also be collectively controlled (e.g., using the same control signals) by re-ordering the inputs as shown. If the COL_PTR points to the first column, then the MUXs 614-624 provide the outputs in the order O1, O2, O3, O4, O5 and O6 (first output each) as outputs 1A-3B. If the COL_PTR points to the second column, then the MUXs 614-624 provide the outputs in the order O3, O1, O2, O6, O4 and O5 (second output each) as outputs 1A-3B. If the COL_PTR points to the third column, then the MUXs 614-624 provide the outputs in the order O2, O3, O1, O5, O6 and O4 (third output each) as outputs 1A-3B.

The redirect controller 312 further enables the write ports 313 to write the uops to the next up to 6 empty storage locations of the queue 314 in the next clock cycle. The XIQ controller 316 uses the pointers ROW_PTR and COL_PTR to identify the first empty storage location, and to determine the address or location of the next up to 6 storage locations in program order. The ROW_PTR and COL_PTR pointers are updated to identify the next empty storage location for the next clock cycle.

Figure 7:
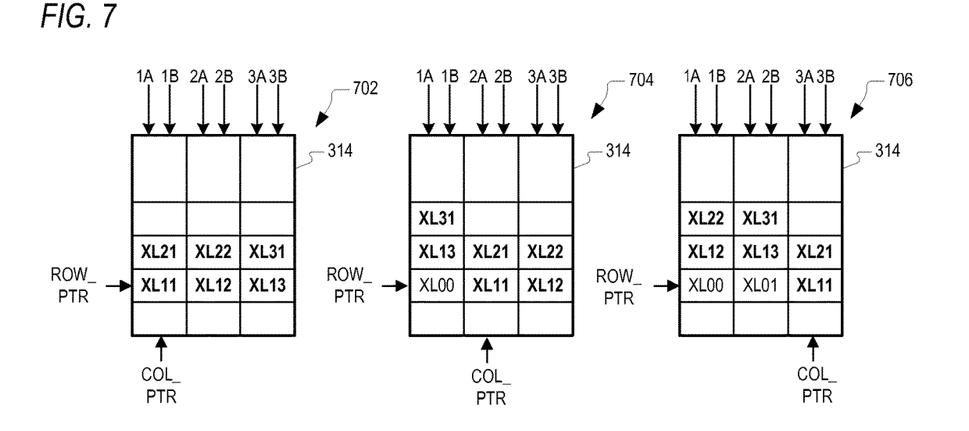
FIG. 7 is a figurative diagram illustrating a redirection and compression operation for storing of 6 uops in program order based on the column pointer according to one embodiment of the present invention.

FIG. 7 is a figurative diagram illustrating a redirection and compression operation for storing of 6 uops XL11, XL12, XL13, XL21, XL22 and XL31 in program order based on the column pointer COL_PTR as shown at 702, 704 and 706, respectively, according to one embodiment of the present invention. As shown at 702, when the COL_PTR points to the first column (column C1) of the current row indicated by the ROW_PTR, then the write ports 1A, 2A and 3A write the uops XL11, XL12 and XL13 into the storage locations of columns C1, C2 and C3, respectively, of the current row. Also, the write ports 1B, 2B and 3B write the uops XL21, XL22 and XL31 into the storage locations of the columns C1, C2 and C3 of the next empty row (in row order as previously described). Thus, the first 3 uops XL11, XL12 and XL13 are stored in the current row, and the $4^{th}$-$6^{th}$ uops XL21, XL22 and XL31 are redirected back beginning with the first column C1 of the next row.

As shown at 704, when the COL_PTR points to the second column (column C2) of the current row indicated by the ROW_PTR, then the write ports 2A and 3A write the uops XL11 and XL12 into the storage locations of columns C2 and C3, respectively, of the current row. Also, the write ports 1A, 2B and 3B write the uops XL13, XL21 and XL22 into the storage locations of the columns C1, C2 and C3, respectively, of the next empty row. Finally, the write port 1B writes the uop XL31 into the storage location of the column C1 of the following row. It is noted that a uop "XL00" is a previously written uop in the first column of the current row. In this manner, XL11 is written in the next available empty storage location without leaving a hole in the queue 314. Thus, the first two uops XL11 and XL12 are stored in the current row, the next three uops XL13, XL21 and XL22 are redirected back to be stored beginning at column C1 of the next row after the current row, and the last uop XL31 is again redirected back to column C1 of the second row after the current row.

As shown at 706, when the COL_PTR points to the third column (column C3) of the current row indicated by the ROW_PTR, then the write port 3A writes the uop XL11 into the storage location of column C3 of the current row. Also, the outputs 1A, 2A and 3B write the uops XL12, XL13 and XL21 into the storage locations of the columns C1, C2 and C3, respectively, of the next empty row. Finally, the write ports 1B and 2B write the uops XL22 and XL31 into the storage locations of the columns C1 and C2, respectively, of the next empty row. It is noted that uops "XL00" and "XL01" are previously written uops in the first and second columns of the current row. In this manner, XL11 is written in the next available empty storage location without leaving a hole in the queue 314. Thus, the first uop XL11 is stored in the current row, the next three uops XL12, XL13 and XL21 are redirected back to be stored beginning at column C1 of the next row after the current row, and the last tow uops XL22 and XL31 are again redirected back to column C1 of the second row after the current row.

In summary, under control of the redirect controller 312, in each clock cycle, the redirect MUX 310 redirects and the write ports 313 write the uops output by the translator 104 to the next up to 6 storage locations of the queue 314 in zigzag order according to redirection and compression operation without leaving holes or unused storage locations. For each of cases 702, 704 and 706, the column and row pointers are updated for the following clock cycle. If the number of uops is at least one but less than 6, then the row and column pointers are updated accordingly.

Figure 8:
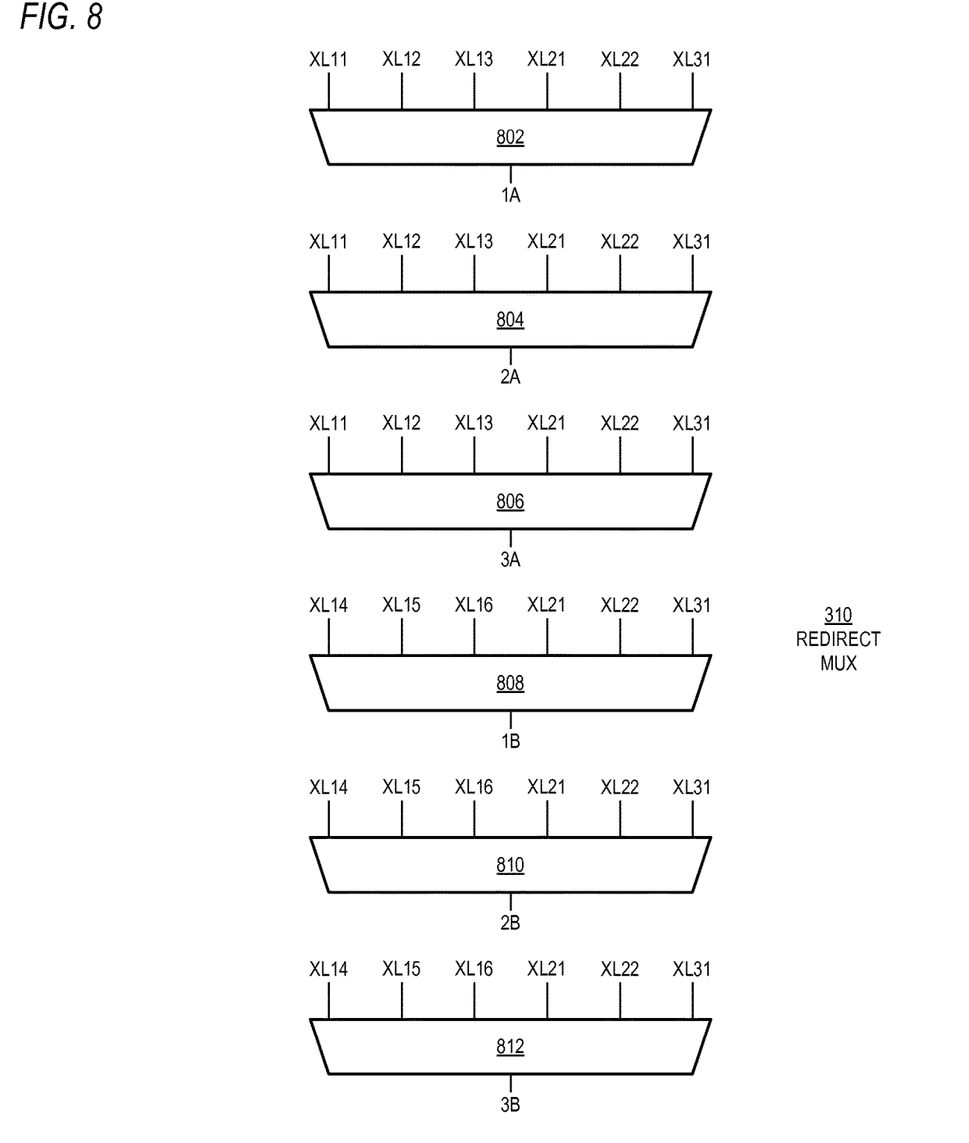
FIG. 8 is a bock diagram illustrating an alternative embodiment of the redirect multiplexer of FIG. 3.

FIG. 8 is a bock diagram illustrating an alternative embodiment of the redirect MUX 310. The 2-tier MUXs 602-624 may be replaced by 6 6:1 MUXes 802, 804, 806, 808, 810 and 812. The first three MUXs 802, 804 and 806 have the same inputs XL11, XL12, XL13, XL21, XL22 and XL31 for developing the outputs 1A, 2A and 3A, respectively. The second three MUXs 808, 810 and 812 have the same inputs XL14, XL15, XL16, XL21, XL22 and XL31 for developing the outputs 1B, 2B and 3B, respectively. The redirect controller 312 is modified accordingly to control each of the MUX 802-812 to redirect the uops in program order in similar manner. The 1A-3B outputs of the MUXs 802-812 are provided to the corresponding inputs of the write ports 313 in the same manner shown in FIG. 7.

Since any one of the 9 outputs of the instruction translator 104 may be written to any storage location, 9 write ports would otherwise be needed. The operation of the redirect MUX 310 shown in either FIG. 6 or FIG. 8 and the configuration of the folded queue 314, however, enables redirection of the uops from the instruction translator 104 to the write ports 313 in such a manner that only 2 write ports are provided for each column and thus for each storage location.

The configuration of FIG. 8 effectively combines the functions of the 12 MUXes 602-624 into the 6 MUXes 802-812 to provide up to 6 uops in program (sequential) order and to redirect those uops to the appropriate write ports. The configuration of FIG. 8 is more efficient than doing the operations serially because there are fewer connections from the outputs of the instruction translator 104 to each write port 313. For example, in FIG. 6, write port 1A is connected to a 3:1 MUX 614 that is preceded by a 3:1 MUX 602 and two 4:1 MUXes 604 and 606. Thus, 11 connections to the instruction translator 104 and two MUX levels are used to provide the data for the write port 1A. For the configuration of FIG. 8, only 6 instruction translator 104 connections are used for each write port. This reduces the number of transistors and wires in the design and reduces the time required for data from the translator outputs to arrive on the write ports 313. The redirect controller 312 calculates the appropriate controls for the MUXes 802-812 to select the uops from the instruction translator 104 and redirect them to the appropriate write port at the same time.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A compressing instruction queue for a microprocessor, the microprocessor including an instruction translator having Q outputs providing up to P microinstructions per clock cycle in any one of multiple combinations of the Q outputs while maintaining program order in which Q is greater than or equal to P, wherein said compressing instruction queue comprises:

a storage queue comprising a matrix of storage locations including N rows and M columns for storing microinstructions of the microprocessor in sequential order, wherein said sequential order comprises a zigzag pattern from a first column to a last column of each row and in only one direction from each row to a next adjacent row of said storage queue, and wherein N and M are each greater than one; and a redirect logic circuit that is configured to receive and write said up to P microinstructions per cycle of a clock signal into sequential storage locations of said storage queue in said sequential order beginning with a next available sequential storage location that is next to a last storage location that was written in said storage queue in a last cycle;

wherein P>M, and wherein said redirect logic circuit writes a first of said up to P microinstructions into any of said M columns of said storage queue in which said next available sequential storage location is located, and to write any remaining ones of said up to P microinstructions following said zigzag pattern in each cycle; and wherein said redirect logic circuit comprises:

a first select logic circuit that is configured to select said up to P microinstructions from among the Q outputs of the instruction translator, wherein said first select logic circuit comprises a first set of P multiplexers including a multiplexer in each of P positions in which each multiplexer has inputs receiving only those microinstructions that are allowed in a corresponding position of said each multiplexer; and a second select logic circuit that reorders said up to P microinstructions according to sequential storage locations of said storage queue beginning with a column position of said next available sequential storage location in said storage queue;

wherein said second select logic circuit comprises a second set of P multiplexers, each having inputs coupled to outputs of a selected subset of said first set of P multiplexers; and wherein said redirect logic circuit comprises a redirect controller that controls said second set of P multiplexers based on which of said M columns of said storage queue includes said next available sequential storage location.

2. The compressing instruction queue of claim 1, wherein said redirect logic circuit comprises P write ports including at least one write port for each of said M columns of said storage queue, and wherein said redirect logic circuit is configured to perform redirection and compression of said up to P microinstructions into said P write ports beginning with said next available sequential storage location.

3. The compressing instruction queue of claim 2, wherein said at least one write port for each of said M columns of said storage queue comprises up to two write ports for each of said M columns.

4. The compressing instruction queue of claim 1, further comprising:
a redirect controller that maintains and updates a column pointer that points to one of said M columns of said storage queue which includes said next available sequential storage location; and
a queue controller that maintains and updates a row pointer that points to one of said N rows of said storage queue which includes said next available sequential storage location; and wherein said queue controller uses said column pointer and said row pointer to address each of said sequential storage locations of said storage queue for storing said up to P microinstructions.

5. The compressing instruction queue of claim 1, further comprising:
said second select logic circuit comprising P outputs; and
P write ports, each having an input coupled to a corresponding one of said P outputs of said second select logic circuit and having an output coupled to provide a microinstruction to only one of said M columns of said storage queue.

6. The compressing instruction queue of claim 1, wherein M is 3 and P is 6, wherein the instruction translator comprises a first translator having 6 outputs for providing up to 6 microinstructions per clock cycle, a second translator having 2 outputs for providing up to 2 microinstructions per clock cycle, and a third translator having 1 output for providing up to 1 microinstruction per clock cycle, wherein said first select logic circuit comprises:
a first multiplexer for selecting from among the first outputs of the first and second translators and the output of the third translator, and having an output that provides a first microinstruction when at least one microinstruction is provided from the instruction translator;
a second multiplexer for selecting from among the second output of the first translator and each of the outputs of the second and third translators, and having an output that provides a second microinstruction when at least two microinstructions are provided from the instruction translator;
a third multiplexer for selecting from among the third output of the first translator and each of the outputs of the second and third translators, and having an output that provides a third microinstruction when at least three microinstructions are provided from the instruction translator;
a fourth multiplexer for selecting from among the fourth output of the first translator and each of the outputs of the second and third translators, and having an output that provides a fourth microinstruction when at least four microinstructions are provided from the instruction translator;
a fifth multiplexer for selecting from among the fifth output of the first translator, the second output of the second translator, and the output of the third translator, and having an output that provides a fifth microinstruction when at least five microinstructions are provided from the instruction translator; and
a sixth multiplexer for selecting between the sixth output of the first translator and the output of the third translator, and having an output that provides a sixth microinstruction when at least six microinstructions are provided from the instruction translator.

7. The compressing instruction queue of claim 6, wherein said second select logic circuit comprises:
seventh, eighth and ninth multiplexers, each having inputs coupled to said outputs of said first, second and third multiplexers and having outputs for providing first microinstructions to first, second and third columns of said storage queue; and
tenth, eleventh and twelfth multiplexers, each having inputs coupled to said outputs of said fourth, fifth and sixth multiplexers and having outputs for providing second microinstructions to first, second and third columns of said storage queue.

8. The compressing instruction queue of claim 7, wherein said redirect logic circuit further comprises:
first and second write ports having inputs coupled to outputs of said seventh and tenth multiplexers, respectively, and having outputs for writing first and second microinstructions to said first column of said storage queue;
third and fourth write ports having inputs coupled to outputs of said eighth and eleventh multiplexers, respectively, and having outputs for writing first and second microinstructions to said second column of said storage queue;
and fifth and sixth write ports having inputs coupled to outputs of said ninth and twelfth multiplexers, respectively, and having outputs for writing first and second microinstructions to said third column of said storage queue.

9. A compressing instruction queue for a microprocessor, the microprocessor including an instruction translator having Q outputs providing up to P microinstructions per clock cycle in any one of multiple combinations of the Q outputs while maintaining program order in which Q is greater than or equal to P, wherein said compressing instruction queue comprises:
a storage queue comprising a matrix of storage locations including N rows and M columns for storing microinstructions of the microprocessor in sequential order, wherein said sequential order comprises a zigzag pattern from a first column to a last column of each row and in only one direction from each row to a next adjacent row of said storage queue, and wherein N and M are each greater than one; and
a redirect logic circuit that is configured to receive and write said up to P microinstructions per cycle of a clock signal into sequential storage locations of said storage queue in said sequential order beginning with a next available sequential storage location that is next to a last storage location that was written in said storage queue in a last cycle;

wherein P>M, and wherein said redirect logic circuit writes a first of said up to P microinstructions into any of said M columns of said storage queue in which said next available sequential storage location is located, and to write any remaining ones of said up to P microinstructions following said zigzag pattern in each cycle; and wherein said redirect logic circuit comprises:

P multiplexers, each having P inputs coupled to a selected subset of said Q outputs of the instruction translator based on a relative position of said P multiplexers from 1 to P, wherein a first half of the P multiplexers have the same first inputs, and a second half of the P multiplexers have the same second inputs, wherein the second inputs are different than the first inputs; and a redirect controller that controls said P multiplexers to perform redirection of said up to P microinstructions based on which of said M columns of said storage queue includes said next available sequential storage location.

10. The compressing instruction queue of claim 9, wherein M is 3 and P is 6, wherein the instruction translator comprises a first translator having 6 outputs for providing up to 6 microinstructions per clock cycle, a second translator having 2 outputs for providing up to 2 microinstructions per clock cycle, and a third translator having an output for providing up to 1 microinstruction per clock cycle, wherein said redirect logic circuit comprises:

first, second and third multiplexers, each for selecting from among the first three outputs of the first translator and the outputs of the second and third translators, and having first, second and third outputs, respectively, that provide received ones of first, second and third microinstructions as first microinstructions to be written to the first, second and third columns, respectively, of said storage queue; and fourth, fifth and six multiplexers, each for selecting from among the last three outputs of the first translator and the outputs of the second and third translators, and having first, second and third outputs, respectively, that provide received ones of fourth, fifth and sixth microinstructions as second microinstructions to be written to the first, second and third columns, respectively, of said storage queue.

11. The compressing instruction queue of claim 10, further comprising:

first, second and third write ports having inputs coupled to said first, second and third multiplexers, respectively, and having outputs for providing first microinstructions to corresponding storage locations within said first, second and third columns, respectively, of said storage queue; and fourth, fifth and sixth write ports having inputs coupled to said fourth, fifth and sixth multiplexers, respectively, and having outputs for providing second microinstructions to corresponding storage locations within said first, second and third columns, respectively, of said storage queue.

12. A microprocessor, comprising:

an instruction translator that is configured to translate a plurality of architectural instructions and to provide up to P microinstructions per clock cycle of a clock signal, wherein said instruction translator comprises Q outputs that provide said up to P microinstructions per clock cycle to a redirect logic circuit in any one of multiple combinations, in which Q is greater than or equal to P;

a compressing instruction queue, comprising:

a storage queue comprising a matrix of storage locations including N rows and M columns for storing microinstructions from said instruction translator in a sequential order, wherein said sequential order comprises a zigzag pattern from a first column to a last column of each row and in only one direction from each row to a next sequential row of said storage queue, and wherein N and M are each greater than one; and said redirect logic circuit that is configured to receive and write said up to P microinstructions per cycle of a clock signal into sequential storage locations of said storage queue in said sequential order beginning with a next available sequential storage location that is next to a last storage location that was written in said storage queue in a last cycle;

wherein P>M, and wherein said redirect logic circuit writes a first of said up to P microinstructions into any of said M columns of said storage queue in which said next available sequential storage location is located, and to write any remaining ones of said up to P microinstructions following said zigzag pattern in each cycle; and a processing logic circuit that is configured to receive and process microinstructions from said storage queue one row at a time in program order in a clock cycle; and wherein said redirect logic circuit comprises:

a first select logic circuit that is configured to select said up to P microinstructions from said Q outputs of said instruction translator wherein said first select logic comprises a first set of P multiplexers including one multiplexer in each of P positions in which each multiplexer has inputs receiving only those microinstructions that are allowed in a corresponding position of said each multiplexer; and a second select logic circuit that reorders said up to P microinstructions according to sequential storage locations of said storage queue beginning with a column position of said next available sequential storage location in said storage queue;

wherein said second select logic circuit comprises a second set of P multiplexers, each having inputs coupled to outputs of a selected subset of said first set of P multiplexers; and wherein said redirect logic circuit comprises a redirect controller that controls said second set of P multiplexers based on which of said M columns of said storage queue includes said next available sequential storage location.

13. The microprocessor of claim 12, wherein said redirect logic circuit comprises up to P write ports, and wherein said redirect logic circuit is configured to perform selection and redirection of said up to P microinstructions to up to two write ports per column beginning with said next available sequential storage location.

14. The microprocessor of claim 12, further comprising:

said second select logic circuit comprising P outputs; and

P write ports, each having an input coupled to a corresponding one of said P outputs of said second select logic circuit and having an output coupled to provide a microinstruction to only one of said M columns of said storage queue.

15. A microprocessor, comprising:
an instruction translator that is configured to translate a plurality of architectural instructions and to provide up to P microinstructions per clock cycle of a clock signal, wherein said instruction translator comprises Q outputs that provide said up to P microinstructions per clock cycle to a redirect logic circuit in any one of multiple combinations, in which Q is greater than or equal to P;
a compressing instruction queue, comprising:
- a storage queue comprising a matrix of storage locations including N rows and M columns for storing microinstructions from said instruction translator in a sequential order, wherein said sequential order comprises a zigzag pattern from a first column to a last column of each row and in only one direction from each row to a next sequential row of said storage queue, and wherein N and M are each greater than one; and
- said redirect logic circuit that is configured to receive and write said up to P microinstructions per cycle of a clock signal into sequential storage locations of said storage queue in said sequential order beginning with a next available sequential storage location that is next to a last storage location that was written in said storage queue in a last cycle;
- wherein $P>M$, and wherein said redirect logic circuit writes a first of said up to P microinstructions into any of said M columns of said storage queue in which said next available sequential storage location is located, and to write any remaining ones of said up to P microinstructions following said zigzag pattern in each cycle; and a processing logic circuit that is configured to receive and process microinstructions from said storage queue one row at a time in program order in a clock cycle; and wherein said redirect logic circuit comprises P multiplexers, each having P inputs coupled to a subset of P of said Q outputs of said instruction translator, and wherein each of said P multiplexers selects from among said Q outputs based on which of said M columns of said storage queue includes said next available sequential storage location, wherein a first half of the P multiplexers have the same first inputs, and a second half of the P multiplexers have the same second inputs, wherein the second inputs are different than the first inputs.

* * * * *